United States Patent [19]
Hoffman et al.

[11] 4,429,360
[45] Jan. 31, 1984

[54] PROCESS AND APPARATUS FOR INTERRUPTING AND RESTARTING SEQUENTIAL LIST-PROCESSING OPERATIONS

[75] Inventors: Roy L. Hoffman, Pine Island; William G. Kempke, Rochester; John W. McCullough, Rochester; Frank G. Soltis, Rochester; Richard T. Turner, Rochester, all of Minn.

[73] Assignee: International Business Machines Corporation, Armonk, N.Y.

[21] Appl. No.: 201,880

[22] Filed: Oct. 29, 1980

Related U.S. Application Data

[63] Continuation of Ser. No. 953,982, Oct. 23, 1978, abandoned.

[51] Int. Cl.³ .............................................. G06F 9/06
[52] U.S. Cl. .................................................. 364/200
[58] Field of Search ......................... 364/200 MS File

[56] References Cited

U.S. PATENT DOCUMENTS

| | | | |
|---|---|---|---|
| 3,548,384 | 12/1970 | Barton et al. | 364/200 |
| 3,713,107 | 1/1973 | Barsamian | 364/200 |
| 3,774,163 | 11/1973 | Recoque | 364/200 |
| 4,041,462 | 8/1977 | Davis et al. | 364/200 |
| 4,084,228 | 4/1978 | Dufond et al. | 364/200 |

OTHER PUBLICATIONS

*Interrupt Stacking*, Draper et al., IBM TDB vol. 20, No. 1, Jun. 1977, pp. 324–327.

*Primary Examiner*—Harvey E. Springborn
*Attorney, Agent, or Firm*—Donald F. Voss

[57] ABSTRACT

A method and apparatus are provided to enable interruption of list processing operations in a computer system and to enable restart from the point of interruption. A mechanism, at a predetermined point of the list processing operation, operates to recognize occurrences of interrupting events. If any such events are present, a mechanism saves the status of the list processing operation, saves the identification of the task associated with instruction executing the list processing operation and locks the list or queue. After the interrupt is handled, a mechanism restores status, and unlocks the list or queue only when the identified task is active again and the instruction which had been executing the list processing operation is again executing.

9 Claims, 6 Drawing Figures

PROCESS AND APPARATUS FOR INTERRUPTING AND RESTARTING SEQUENTIAL LIST-PROCESSING OPERATIONS

This is a continuation of application Ser. No. 953,982 filed Oct. 23, 1978, now abandoned.

TECHNICAL FIELD

The present invention relates to processing information stored in the memory of a digital computer system and more particularly to method and apparatus for enabling interruption of processing operations and restart thereof from point of interruption. The information is organized as chained lists of elements. Each element could be used, for example, to contain a data record. Organization of data records into chained lists of elements can facilitate searching and updating the data, for example.

BACKGROUND ART

List processing in a computer system refers to the operations such as inserting, removing, or searching for elements on a chained list of elements in storage. These chained lists are also called queues. FIG. 1 shows the structure of a typical chained list 2. The chained list 2 has a header 4 which contains status information about the list along with the address of the first element on the list. The chained list also includes a plurality of elements 6, 8, and 10. Elements adjacent in a chain are not necessarily contiguous in storage.

Each element contains an address field for encoding an address of the next element on the list, a field key for encoding a priority number, and a data field. The priority number in the key field is used to order the elements on the list. Elements could be placed on the list in ascending key sequence with the lowest value key first on the list, for example.

U.S. Pat. No. 4,177,513 filed July 8, 1977 discloses a computer system particularly suitable for processing such chained lists. The specification of U.S. Pat. No. 4,177,513 is incorporated herein by reference.

Among typical list-processing operations are operations to remove and insert elements in a chained list. An operation to remove an element having a desired key value would ordinarily include searching the list one element at a time until an element with the desired key value was located. This element would then be removed from the list by moving the address contained in the address field of the located element into the address field of the previous element on the chain. In this way the chain is made to bypass the removed element. Insert operations are ordinarily performed in a similar manner.

Because of the sequential nature of the insert and remove operations, and because chains can be extremely long, list processing operations can be very time consuming. For this reason, it is desirable for list processing operations to be interruptible to permit the computer to attend to other matters from time to time. One approach used in the past is to permit interrupts to occur between the processing of adjacent elements in the chain. If an interrupt does occur, the list-processing operation is aborted and later restarted from the beginning. The disadvantage of this approach is that if the chain is very long and interrupts sufficiently frequent, situations can arise in which the list-processing operations can never by completed.

Additional difficulties can arise if elements of a single chain are stored on different pages of a virtual memory storage system. In such a system, the address field of an element in a chain stored in main storage might reference an element in a page not presently located in main storage, but stored in a disk, for example. A search operation which encountered this address would generate a "page fault," which would result not only in the loading of the referenced page, but also in the restarting of the search. However, the page containing a previous element on the chain might have been removed from main storage to make room for the newly loaded page. Consequently, a second page fault would be generated before the originally referenced element was encountered. For very long chains it is possible that such page faulting and loading might become cyclical and the originally referenced element never reached. Such cyclical page faulting and loading behavior in a virtual memory system is termed "thrashing," and can be an extremely troublesome problem.

Interrupts are normally allowed only after execution of an instruction has been completed. Instructions have been made interruptable in the past such as a move instruction where the move is bounded. List processing instructions operate on unbounded lists and thus the interrupt problem is different and more difficult. Hence, in order to interrupt a list processing operation without aborting it, it is necessary to provide a means for recognizing a pending interrupt or event and for doing so during a particular time of the list processing operation. The present invention provides such a means which looks for pending interrupts during insert operations of list processing. Additionally, the status of the list processing operation must be saved and the identification of the task having the currently executing list processing instruction must be saved because other tasks having list processing instructions can normally access the list or queue. Because of this, and in order to preserve the integrity of the operation it is desirable to lock the list or queue from access by other tasks. If access by another task were allowed, that task could remove elements from the list or queue and thereby destroy the integrity. The present invention provides means for saving the aforementioned status, the identification of the task active during the list processing operation, means for locking the list or queue and means for unlocking the list or queue only when the interrupted task is again active.

DISCLOSURE OF THE INVENTION

We have invented a list-processing apparatus and process which allows list processing operations to be restarted subsequent to an interruption, avoiding problems of the prior art noted above.

In particular, the process of the present invention permits interrupting and restarting of a sequential list-processing operation. The list-processing operation including the steps of accessing in a sequential order a plurality of elements located in storage of a digital computer. The list-processing operation is identified by a list-process-descriptor. Each element includes an address field, which encodes the address of the next element to be accessed. The encoding is preferably nothing more than the binary-number address of the next element. The plurality of elements in the order specified by the address fields defines a chain of elements. The beginning of the chain is defined by a header, which includes an address field which encodes the address of the first element of the chain.

The process of the invention includes the step of receiving an interrupt signal which indicates that the sequential list-processing operation is to be interrupted.

The process further includes setting a busy-bit bit position in the header of the chain to a state which indicates that a list processing operation on the chain has been interrupted. For example, the busy-bit bit position could be set to a logic one.

The process further includes loading an interrupt-address field of the chain header with the address of the element being accessed by the list-processing operation at the time interrupt signal was received. An interrupted-task field of the chain header is loaded with the descriptor of the executing task.

The process of the invention also includes the step of receiving a request to carry out a requested list-processing operation. The list-processing operation for which the request is made has an access-request descriptor, which may or may not be identical with the descriptor stored in the interrupted-task field of the chain header.

Whether or not the request to carry out the requested list-processing operation is honored depends upon the information stored in the header of the chain and on the access-request descriptor. Thus the process of the invention further includes the step of reading the state of the busy-bit from the header of the chain and the step of comparing the access-request descriptor to the descriptor stored in the interrupted-task field of the header. The process then includes one of three alternative steps.

As a firt alternative, the process includes the step of restarting the requested-list-processing operation at the element whose address is stored at the interrupt-address field of the header if the stage of the busy-bit indicates that a list-processing operation on the chain has been interrupted, and the access-request descriptor matches the descriptor stored in the interrupted-task field of the header.

As a second alternative, the process includes inhibiting a starting of the requested list-processing operation if the state of the busy-bit indicates that a list-processing operation on the chain has been interrupted, and the access-request descriptor fails to match the descriptor stored in the interrupted-task field of the header.

As a third alternative, the process includes a step of starting the requested list-processing operation at the first element of the chain if the state of the busy-bit indicates that no list-processing operation on the chain has been interrupted.

One feature of the invention is that the process permits interruptible list-processing in a virtual memory computer system. Since a list-processing operation which has been interrupted is restarted from the element on the chain at which the interruption occurred, the thrashing problem noted above is avoided.

A second feature of the invention concerns the protection of data stored in a chain during an interruption period. If a first list-processing operation is interrupted, the elements of the chain on which the operation was being performed will not be altered by any second list-processing operation during the course of the interruption. When the first list-processing operation is restarted, the data in the chain will be the same as it was before the interruption.

The process of the invention can be implemented in a computer system with hardwired logic circuits. In addition, if the computer system has a microprogrammed central processing unit, it may be possible to implement the process of the invention by microprogramming the central processor.

BRIEF DESCRIPTION OF THE DRAWINGS

A preferred embodiment of the invention is discussed below with reference to the following drawings:

FIGS. 4-1 and 4-2 taken together, with FIG. 4-2 disposed to the right of FIG. 4-1, are a flow chart of processing a SENDM instruction subject to an interruption.

BEST MODE OF CARRYING OUT THE INVENTION

In what follows, an embodiment of the invention implemented on a digital computing system particularly adapted for list processing is described. The digital computing system is disclosed in U.S. Pat. No. 4,177,513 cited above, which may be consulted for details concerning the architecture of the computing system and its repertoire of list-processing instructions. Changes in the earlier-disclosed apparatus which facilitate the implementation of the present invention are noted below.

Figure 2:
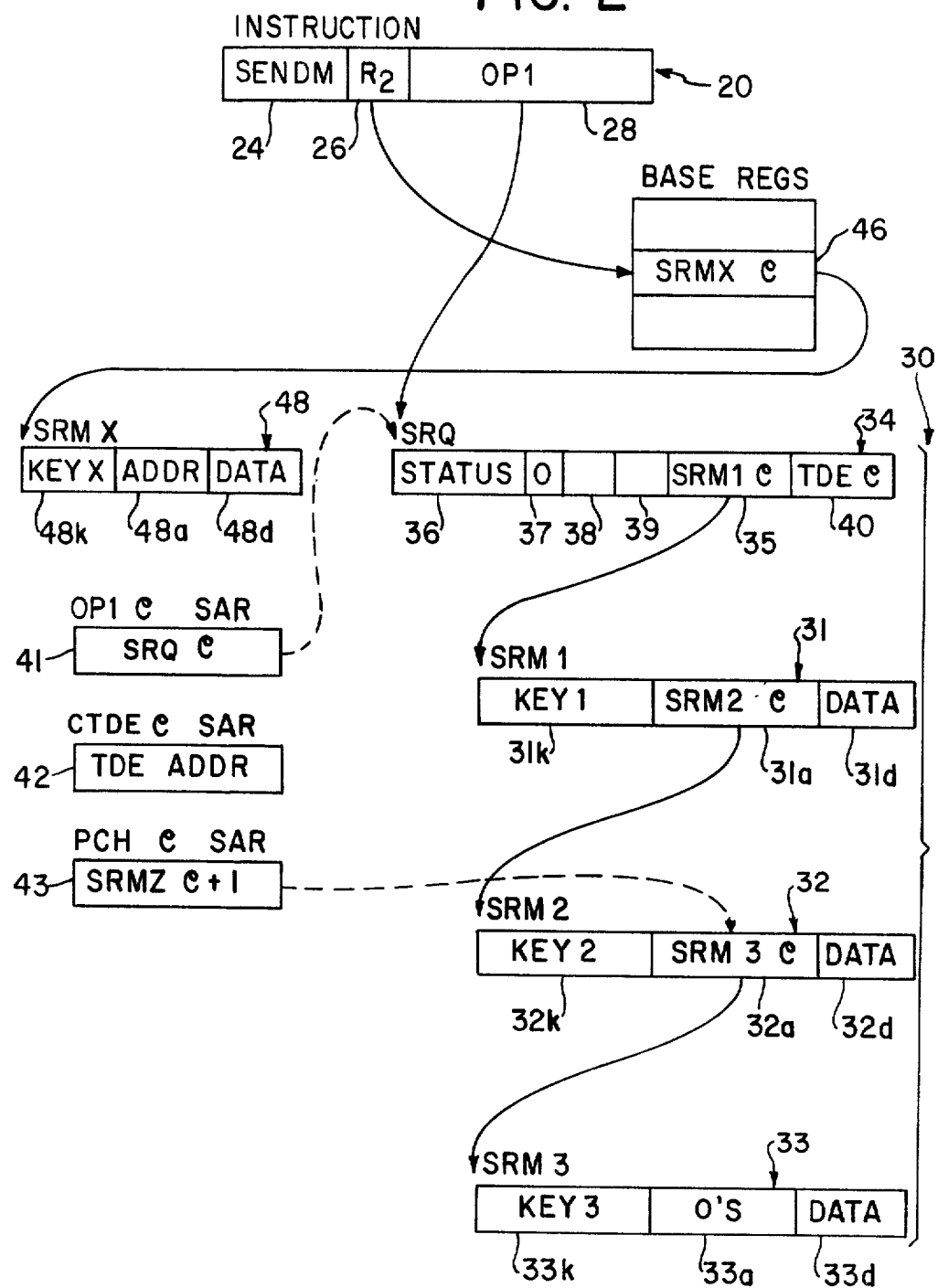
FIG. 2 is a schematic diagram illustrating a chained list of elements in storage and associated registers during a list processing operation just prior to an interruption.

Turning now to FIG. 2, an instruction register 20, which corresponds to instruction register 35 of referenced U.S. Pat. No. 4,177,513 includes three fields: an OP-code field 24, a base-register field 26, and an address field 28.

The OP-code field 24 is shown as containing a machine-language instruction designated a SENDM instruction. The SENDM instruction calls for a list-processing operation which is described in detail in the '513 cited above. For the purposes of understanding the present invention, it is sufficient to note that the SENDM instruction, which is described in referenced U.S. Pat. No. 4,177,513, causes an element termed a Send/Receive Message (SRM) to be inserted in a chain, termed a Send/Receive Queue (SRQ), at an appropriate priority location. SENDM instructions are executed under control of system objects termed task dispatching elements (TDE), as explained in the '513 patent. Each task dispatching element has an address in storage. Each TDE has an instruction stream associated with it which can include a SENDM instruction. The address of the TDE which has a SENDM instruction in its instruction stream can be used to identify the TDE for that SENDM instruction.

The address field 28 of the instruction register 20 contains the address of the location in storage of a header 34 of the send/receive queue (SRQ) 30. The present invention requires that the SRQ header in the referenced U.S. Pat. No. 4,177,513 be modified. In the referenced U.S. Pat. No. 4,177,513, see FIG. 3 thereof, the SRQ is shown as having a SRM chain @ field and a TDE chain @ field. These two fields are retained in header 34 of the present invention and are identified by reference characters 35 and 40 respectively. In addition to fields 35 and 40, the header 34 has a status field 36, a busy bit field 37, an interrupted field 38 and an address interrupt field 39. The significance of these added fields in header 34 will be described later herein in connection with an example of execution of a SENDM instruction. Suffice it to say at this time, these added fields are check point fields or save areas for information existing at the time the list processing operation is interrupted and required for restart at the point of interruption.

The base-register field 26 in the instruction register 20 identifies a base register 46 which contains an address of the location in storage of an unchained send/receive message (SRM) 48 which is to be inserted in the send-/receive queue (SRQ) 30 by the SENDM operation. The unchained send/receive message (SRM) 48 includes a key field 48k, and address field 48a, and a data field 48d. The base register 46 is addressed or pointed to by the contents of the base-register field 26 in the manner described in the referenced U.S. Pat. No. 4,177,513 with respect to a base register of register array 70 of that patent.

In addition to the header 34, the send/receive queue (SRQ) 30 includes a first 31, a second 32, and a third 33 send/receive message (SRM). Each send/receive message (SRM) includes a key field 31k-33k, and address field 31a-33a and a data field 31d-33d. The SRM's are the same as the SRM's shown and described in the referenced U.S. Pat. No. 4,177,513. The numbers stored in the key fields 31k-33k establish a relative priority among the send/receive elements 31-33 which determined the order in which they were placed on the list or queue 30. The address field 31a of the first send/receive message 31 contains the address of the second send-/receive message 32. Similarly, the address field 32a of the second send/receiver message 32 contains the address of the third send/receive message 33. The address field 33a of the third send/receive message 33 contains a zero, which signifies that it is the last element on the send/receive queue 30. The address of the first send-/receive messsage 31 is stored in a first SRM address field 35 of the header 34.

In addition to the OP1 address register 41, a CTDE address register 42 and a PCH address register 43 are used to store addresses of certain items in storage which pertain to the SENDM operation. The CTDE address register 42 stores the address of the current task dispatching element which owns the executing SENDM instruction. Thus the address stored in the CTDE address register 42 serves as a descriptor of the task owning the SENDM instruction. The PCH address register 43 stores an address pointing to an address field of a send/receive message being accessed by the SENDM instruction. The registers 41, 42 and 43 correspond to the registers 54, 53 and 56 respectively in FIG. 1—1 of the referenced U.S. Pat. No. 4,177,513.

An interruption and restart of a SENDM instruction according to the invention is discussed below in connection with the schematic diagrams of FIGS. 2 and 3. In what follows, the value of the key number 48k from the unchained send/receive message 48 is taken to be greater than the value of the key number 33k from the third send/receive message 33, so that the SENDM operation will insert the send/receive messsage 48 at the end of the send/receiver queue 30.

FIG. 2 illustrates schematically the state of a SENDM operation just prior to recognition of an interrupt. An interrupt is an asynchronously occurring event with respect to operation of the central processing unit (CPU). In some computer systems interrupts are stacked, in others the interrupt must be reissued until it is accepted, i.e., after execution of an instruction has been completed. In the computer system of the referenced U.S. Pat. No. 4,177,513 interrupts are recorded as events on an event stack and certain sequence control latches are set. The states of certain sequence control latches are scanned or decoded during the first step of an I-fetch cycle as illustrated in FIG. 21 of U.S. Pat. No. 4,177,513. In the present invention means are provided to scan or test the state of these certain sequence control latches during execution of a SENDM instruction. OP1 address register 41 contains the address of the header 34 of the send/receive queue 30 being accessed by the SENDM instruction. The PCH address register 43 contains the address of the address field 32a of the second send/receive message 32 which in turn contains the address of the third send/receive message 33. Thus the key value in the key field 33k of the third send/receive message 33 will be compared to the value stored in the key field 48k of the unchained send/receive message 48.

In FIG. 2, the busy-bit field 37 of the header 34 is at logic zero. When the busy-bit field is zero, neither the interrupt-operation field 38 nor the address-interrupt field 39 of the header 30 is accessed, so these two fields can contain arbitrary numbers.

Figure 3:
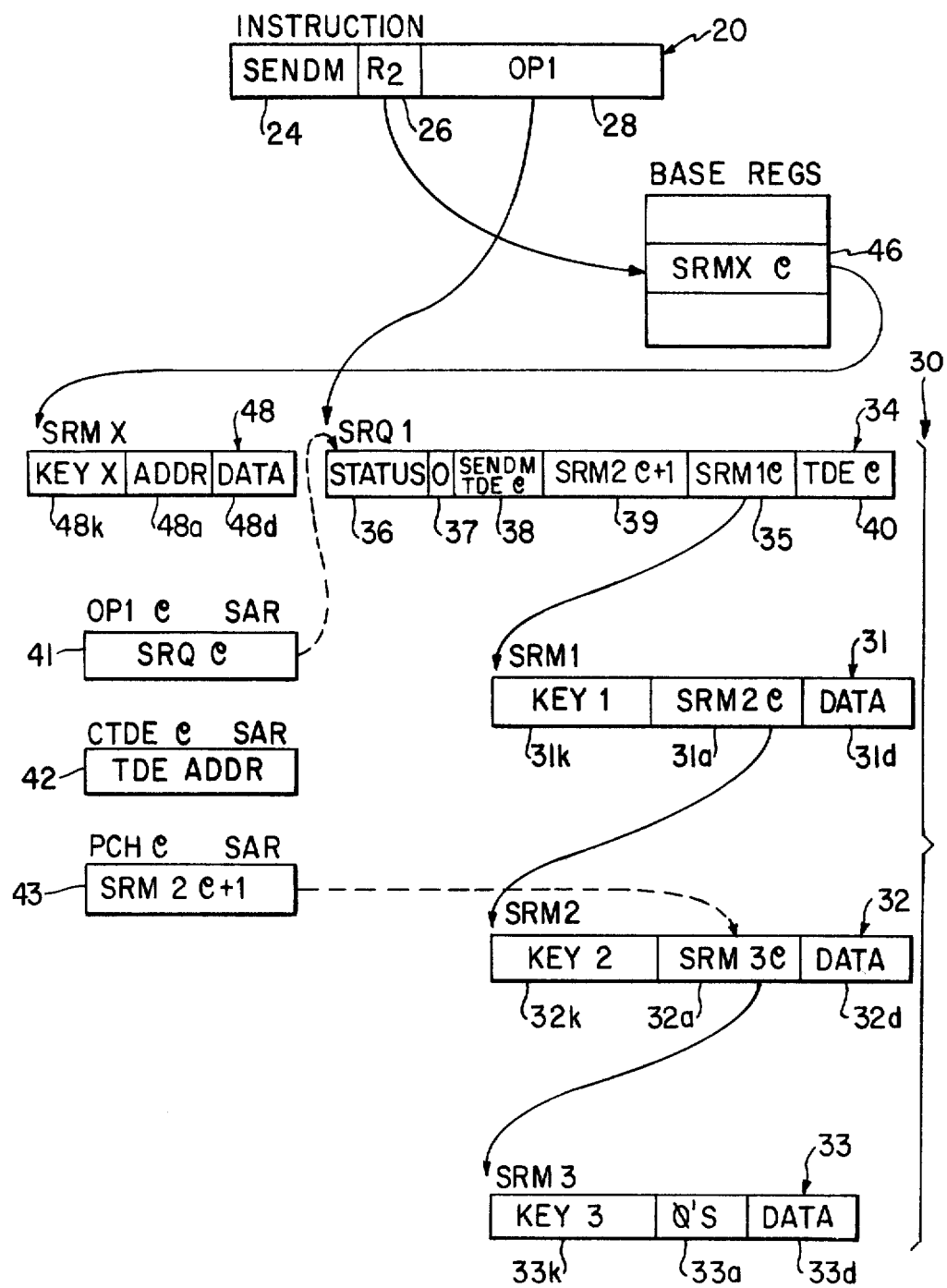
FIG. 3 is a schematic diagram illustrating the chain and registers of FIG. 2 subsequent to restarting the list-processing operation after the interruption.

FIG. 3 illustrates schematically the state of execution of the SENDM instruction after it has been restarted following an interrupt. The interrupt occurred after the second send/receive message 32 had been accessed but before the third send/receive message 33 was accessed. When the interrupt was recognized a task switch took place causing the task-dispatching element to switch from active status whereby the execution of the SENDM instruction terminated. Prior to the state of FIG. 3 the address in the PCH address register 43 was stored in the interrupt-address field 39 of the header 34. The address in the CTDE address register 42 was stored in the interrupted-operation field 38. The busy-bit field 37 of the header was set to logic one.

When the task dispatching element which had issued the SENDM instruction regains active status, execution of the SENDM instruction continues. The address of this task dispatching element was compared to that address stored in the interrupted-operation field 38. Since the addresses were the same, the busy-bit was cleared to logic zero and execution of the SENDM instruction restarted at the second send/receive element 32 whose address was stored in the interrupt address field 39 of the header 34.

When the busy-bit 37 is cleared to logic zero, any list processing instruction can access the send/receive queue 30.

Had a SENDM instruction been executed, not by the task dispatching element which had been interrupted, but by a task-dispatching element having a different address, the descriptors would not have matched and the SENDM instruction would not have been permitted to access the send/receive queue 30.

For the present invention the SENDM execution cycles shown in FIG. 24 of referenced U.S. Pat. No. 4,177,513 are changed to that shown in FIG. 5 of this application. The SENDM execution starts out as before in referenced U.S. Pat. No. 4,177,513 with setting of sequence control latches whereby S, R, ST and RT latches 87,88, 97 and 98 are set to the one, zero, zero and zero states respectively as indicated by block 120 in FIG. 5. The SRQ status and busy bit fields 36 and 37 were loaded into the SA register 36 of referenced U.S. Pat. No. 4,177,513. An A2 CPU cycle is taken in FIG. 5 of the present application to determine the state of the busy bit in field 37 by ANDing the fields 36 and 37 with a half-word mask as indicated by block 121. If the result is all 0's, the busy bit is off and the AZ latch 96 is set.

Figure 5:
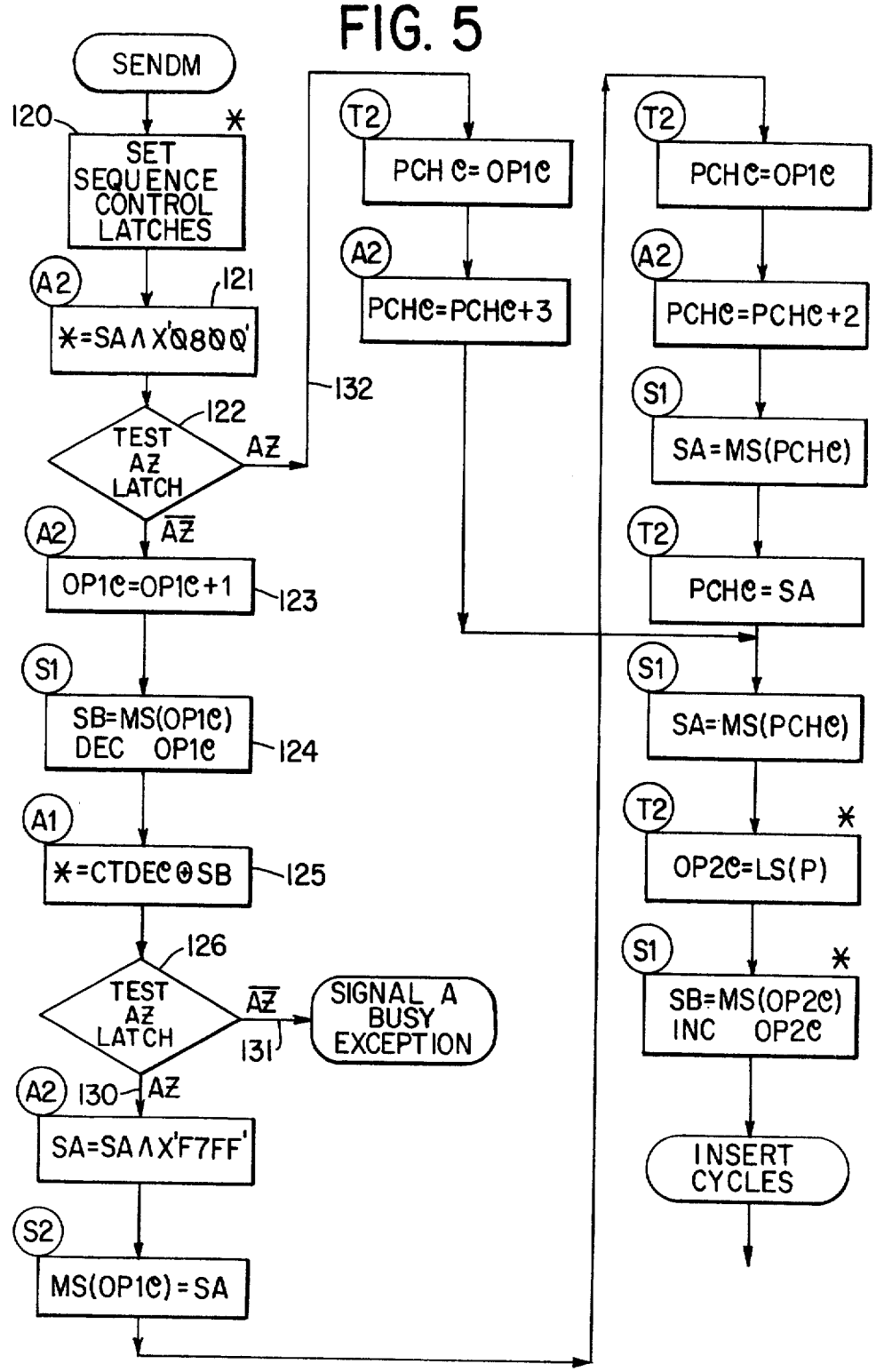
FIG. 5 is a flow chart of a SENDM restart operation.

The state of the AZ latch 96 is tested as indicated by the block 122. If the latch 96 is set, the operation switches to a T2 CPU cycle as indicated by line 132 in FIG. 5. If the AZ latch 96 is not set, indicating that the SRQ is busy or locked, another A2 cycle, block 123, FIG. 5 is taken to increment the OP1 @ register 54 of referenced U.S. Pat. No. 4,177,513 to develop an address for pointing to the interrupted field 38 of header 34 shown in FIGS. 2 and 3 of the present application. A S1 CPU cycle, block 124, is then taken to fetch the contents of the interrupted field 38 from main storage 10 and place it in the SB register 37 of the CPU shown and described in referenced U.S. Pat. No. 4,177,513. Also, during this S1 CPU cycle the OP1 @ SAR 54 is decremented so as to point back to the status and busy bit fields 36 and 37. The contents of the interrupted-operation field 38 are then compared with the address of the currently active TDE, i.e., with the contents of the CDTE @ SAR 53 through the use of an exclusive OR operation of the A1 cycle, noted by block 125. The results of the exclusive OR operation are determined by testing the AZ latch 96, as indicated by block 126. If the AZ latch is not set, a busy exception is signalled, as indicated by line 131.

If the AZ latch is set, indicating that the two values are equal, then an A2 CPU cycle is taken for performing a logical AND operation using the ALU 45 of referenced U.S. Pat. No. 4,177,513 to set the busy bit off in the SA register 36 of the referenced patent. A S2 cycle is then taken to write the updated status and busy bit fields 36 and 37 of the present application into main storage 10 of the referenced patent. A T2 cycle is then taken to transfer the contents of OP1 @ SAR 54 into the PCH @ SAR 56. The PCH @ SAR 56 is then incremented by two during an ensuing A2 CPU cycle. The address in the PCH @ SAR 56 now points to the last SRM searched. The PCH @ SAR 56 is functioning as a temporary work SAR. A S1 cycle is then taken to fetch the last SRM searched address from storage 10 and enter it into the SA register 36. A T2 CPU cycle is then taken to transfer the contents of SA register 36 into the PCH @ register 56. The address of the first field of the next SRM to be searched is fetched from storage 10 and entered into the SA register 36 by executing a S1 cycle. It should be noted that this S1 cycle is also taken following a sequence of T2 and A2 cycles when the AZ latch 96 tested by block 122 of FIG. 5 was set, i.e., indicating that the queue was not busy. In that instance, the T2 cycle is taken to load the PCH @ register 56 with the contents of the OP1 @ register 54 and then the A2 cycle is taken to increment the PCH @ register 56 by three.

Figure 1:
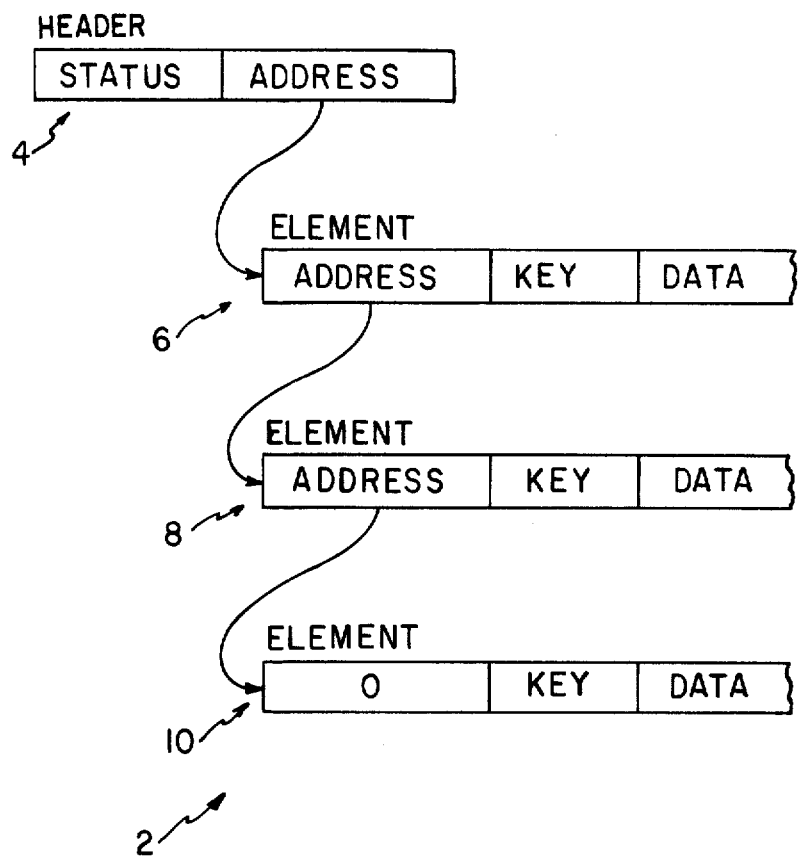
FIG. 1 is a schematic diagram of a prior-art chain of elements discussed previously.
Figures 1, 4:
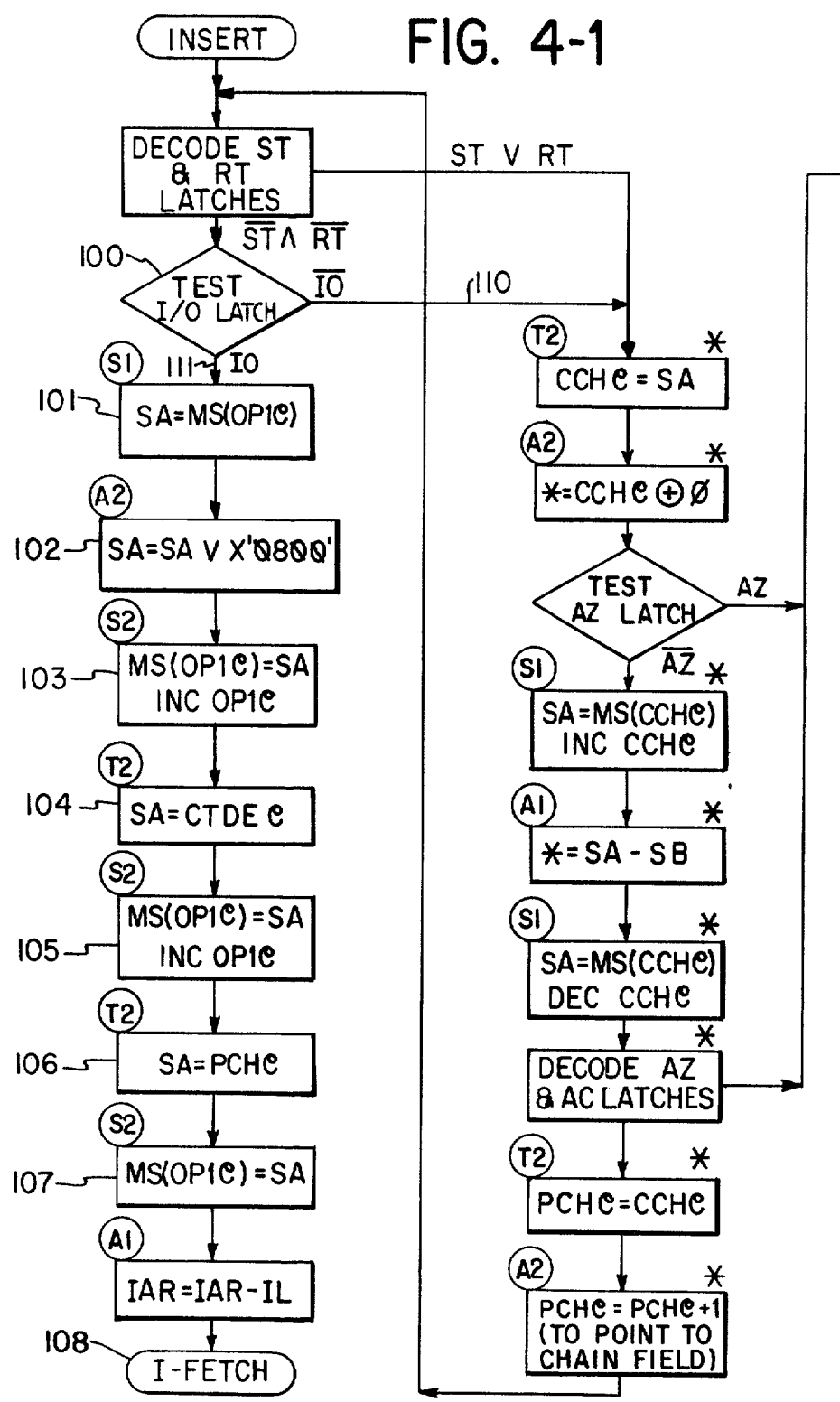
Figures 2, 4:
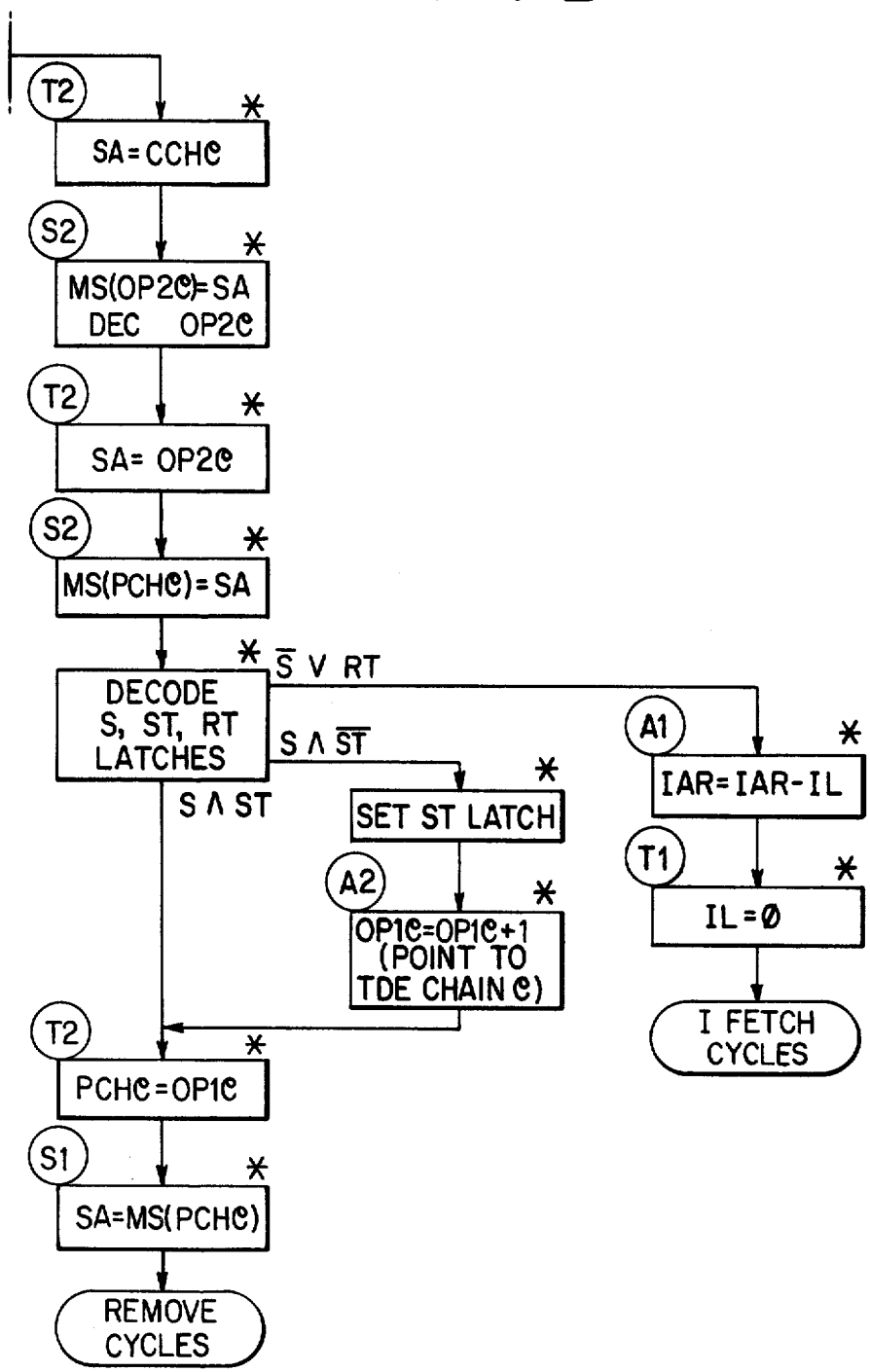

With the address of the first field of the next SRM fetched from main storage 10 and entered into SA register 36, a T2 cycle is taken as in the referenced U.S. Pat. No. 4,177,513 to load the OP2 @ register 55 with the address from base register 46 of the present application, FIG. 2, which corresponds to base register 6 of referenced U.S. Pat. No. 4,177,513. This T2 cycle is the same T2 cycle which is taken for the SENDM cycles of FIG. 24 in the referenced U.S. Pat. No. 4,177,513 and this T2 cycle is then followed by a S1 cycle which causes the transfer of the key field of the SRM to be inserted into the SRM chain to be transferred from main storage 10 to SB register 37. Also during this S1 cycle, the address contained in OP2 @ SAR 55 is incremented to point to the SRM chain address field of the SRM to be inserted. The operation then switches to insert cycles which are shown in FIGS. 4-1 and 4-2 of the present application.

From the foregoing, it is seen that if the SRQ is not busy, i.e., the AZ latch 96 is set, it is not necessary to test the owner TDE address field, i.e., field 38 of the header 34. When the AZ latch 96 is not set, the subsequent T2 and A2 cycles which are taken as in FIG. 5 of this application replace the function performed by the last cycle, i.e, the T2 cycle which was taken in the SENDM cycles of FIG. 24 in referenced U.S. Pat. No. 4,177,513. As previously indicated, these two cycles function to point the address in the PCH @ SAR 56 to the SRM chain address field of the SRQ. This is necessary in case the SRM addressed by the I field of the SENDM instruction is then queued directly to the SRQ, i.e., top on the list or the only element on the list if the list were initially empty. It is seen that the added cycles described above function to perform a restart test and the restart operation. The address of SRM 1 has been loaded into the SA register 36 and the address of the SRM to be inserted onto the SRQ is in the OP2 @ register 55. The key field of the SRM to be inserted is in the SB register 37.

The insert cycles of the referenced U.S. Pat. No. 4,177,513 had to be changed for the present invention so as to include an interrupt pending test and a check point operation. The first step of the insert cycles for the present application as contrasted to the first step of insert cycles for the referenced U.S. Pat. No. 4,177,513 is to decode the states of the ST and RT latches 97 and 98 respectively, as illustrated in FIG. 4-1 of this application. If either of these latches are set, a TDE chain is being processed and no interrupt test is performed. If both of these latches 97 and 98 are reset, a test for interrupts is made by testing the state of the I/O latch 94 of referenced U.S. Pat. No. 4,177,513. It should be noted that a test for the presence of other interrupts can also be made at this point.

If there is no interrupt pending, the insert cycles take place in the exact manner as described in the referenced U.S. Pat. No. 4,177,513. These cycles are identified by the asterisks located along side the upper right hand corner of the blocks in FIGS. 4-1 and 4-2 of the present application In the example set forth in the present application there is no interrupt pending at the time SRM 1 is interrogated. SRM 2 is processed in the same fashion and at the start of the processing of SRM 2, the I/O latch 94 is still reset. During the processing of SRM 2, an I/O event occurs whereby the I/O latch 94 is set. Thereafter when the operation loops back to process SRM 3, the test of I/O latch 94, as indicated by block 100, FIG. 4-1, in this application will indicate that it is set. This causes the checkpoint cycles, which will now be described, to execute. The first cycle of the checkpoint cycles is a S1 cycle, block 101, which is executed to load the status field 36 and the busy bit field 37 fetched from main storage, using the address in the OP1 @ SAR 54, into the SA register 36. An A2 cycle, block 102, is then taken to perform a logical OR operation whereby the contents of the SA register 36 is logically ORed with a constant emitted by encoder 60 of referenced U.S. Pat. No. 4,177,513. This sets the busy bit of field 37.

A S2 cycle, block 103, is then taken to write the updated fields 36 and 37 into main storage 10. During this same S2 cycle, the OP1 @ SAR 54 is incremented to form an address for pointing to the owner TDE ID field of the SRQ, i.e., field 38. The current TDE address contained in the CTDE @ SAR 53 is moved to the SA register 36 by the following T2 CPU cycle, block 104. A S2 CPU cycle, block 105, is then taken to store the contents of the SA register 36 into main storage 10. Also during this S2 CPU cycle the OP1 @ SAR 54 is incremented thereby forming an address to point to the address of the last SRM searched field, i.e., field 39 of header 34.

A T2 cycle, block 106, is then taken to load the SA register 36 with the contents of the PCH address SAR 56. The contents of the SA register 36 are then transferred to main storage 10 by executing a S2 cycle, block 107. An A1 cycle is then taken to decrement the contents of the IAR SAR 51 of the referenced patent by the value in the IL register 38 to point the IAR SAR 51 back to the SENDM instruction which is interrupted. This completes the check pointing cycles and the operation switches to I-fetch cycles, block 108, which, as pointed out in the referenced U.S. Pat. No. 4,177,513, will decode the D and I/O latches 93 and 94 whereby the I/O interrupt will be handled.

I/O event cycles then service the I/O event as described in referenced U.S. Pat. No. 4,177,513. It should be noted that the servicing of the I/O event could cause other tasks to run before control is returned to the task which issued the SENDM instruction that was interrupted. When the task which issued the interrupted SENDM instruction becomes active again, execution of the interrupted SENDM instruction will continue. The I-fetch cycles for the SENDM instruction will transfer control to execute SENDM cycles of FIG. 5 of this application.

When the A2 cycle, block 121, FIG. 5, of the send message cycles is executed, the busy bit will cause the AZ latch 96 to reset indicating that the SRQ is busy. This causes the execution of the restart cycles described above. These restart cycles include an A2 cycle, block 123, FIG. 5, executed to increment the address in the OP1 address SAR 54 of the referenced patent to point to the owner TDE field 38 of header 34 in this application. A S1 cycle is then executed to fetch field 38 from main storage 10 into the SB register 37 and at the same time, decrement the OP1 SAR 54 as indicated by block 124. By decrementing the OP1 SAR 54, it will contain an address to point back to the status and busy bit fields 36 and 37 of the header 34 in this application. An A1 CPU cycle, block 125, is executed to cause the ALU 45 in the referenced patent to perform an exclusive OR operation whereby the owner TDE address field 38 is compared with the address of the currently active TDE as indicated by the address in the CTDE address SAR 53. In this instance, the two values compare equal to each other and the restart operation is continued. The results of the exclusive OR operation are determined by testing the state of the AZ latch 96 as indicated by block 126 of this application. Had a task with a different TDE address attempted to access the locked SRQ, there would have been a non-compare and a busy exception would have been signalled to the program whereby the send message operation would have been terminated.

An A2 and S2 cycle are then executed in sequence where the A2 cycle is used to set off the busy bit in the SA register 36 and the S2 cycle is used to store the updated status and busy bit fields 36 and 37 of header 34 in this application, in main storage 10 of the referenced U.S. Pat. No. 4,177,513.

Four CPU cycles are executed in sequence, all of them involving the PCH @ SAR 56. In the first two cycles, which are S2 and T2 CPU cycles, the PCH @ SAR 56 is used as a temporary work register for addressing the address of the last SRM searched field of the SRQ header 34, i.e. field 39. The third cycle is a S1 cycle for fetching from storage 10 the contents of the address of last SRM search field 39 and entering it into the SA register 36 and a T2 CPU cycle is then taken to move the contents of the SA register 36 into PCH @ SAR 56. The PCH @ SAR 56 now contains the address of the SRM 2, the particular example of this application, which is, in fact, the address of the last SRM searched prior to the interrupt.

A S1 cycle is then taken to fetch from main storage 10 the address of the first field of the next SRM to be searched and this address is placed into the SA register 36. This cycle is followed by a sequence of a T2 and a S1 cycle where these two cycles are used for loading the OP 2 @ SAR 55 with the address of the key field of the SRM to be inserted into the chain of the SRQ. This key field is entered into the SB register 37. During the S1 CPU cycle, the OP 2 address SAR 55 is incremented to point to the SRM chain address field of the element to be inserted. The operation then switches to insert cycles as previously described.

It is not intended to limit the present invention to the specific embodiment described above. It will be readily apparent that the invention can be used to provide interruptibility for a wide variety of list-processing operations. Among the list processing operations disclosed in U.S. Pat. No. 4,177,513 cited above for which the invention is particularly suitable are the send message (SENDM), receive message (RECM), enqueue (ENQM) and dequeue message (DEQM) instructions. It is recognized that these and other changes may be made in the circuit and process specifically described herein without departing from the scope and teachings of the instant invention, and it is intended to encompass all other embodiments, alternatives and modifications consistent with the present invention.

We claim:

1. A process executed in a multitasking digital computer system for interrupting and restarting a sequential list-processing operation, the list-processing operation being performed under a task identified by a descriptor and including the steps of accessing in a sequential order a plurality of elements located in a storage of said digital computer system, each element including an address field which encodes the address of the next element to be accessed, the plurality of elements in the order specified by the address fields defining a chain of elements, the beginning of the chain being defined by a header which includes an address field which encodes the address of the first element of the chain; the process cmprising:

(a) testing for an interrupt signal indicating that the sequential list procession operation is to be interrupted prior to accessing an element of said plurality of elements;

(b) setting a busy-bit bit position in the header of the chain if said testing indicates the presence of an interrupt signal;

(c) storing the address of the last element accessed after said busy bit has been set;

(d) storing the descriptor identifying the task under which the list-processing operation is being performed in an interrupted-operation field of the chain header;

(e) handling the interrupt;

(f) testing the state of the busy bit in the header of the chain before allowing access to said elements by a list processing operation to be performed under an active task after the handling of the interrupt;

(g) comparing the descriptor of said active task to the descriptor stored in the interrupted-operation field of the header of the chain;

(h) resetting the busy bit to allow access to said elements for restarting the list-processing operation under the active task at the element located at the address stored in the interrupt-address field of the header if the descriptor of the active task compares with the descriptor stored in the interrupted-operation field; and (i) signaling an exception to the active task if the descriptor of the active task does not compare with the descriptor stored in the interrupted operation field.

2. A process executed in a multitasking digital computer system for interrupting and restarting a sequential list-processing operation, the list-processing operation being performed under a task identified by a descriptor and including the steps of accessing in a sequential order a plurality of elements located in storage of the digital computer system, each element including at least an address field which encodes the address of the next element to be accessed or an identifier for a last element, a header element and the plurality of elements in the order specified by the address fields defining a chained list, the process comprising:

(a) providing said header element with at least a busy bit field, an interrupted operation field and an interrupt address field;

(b) detecting the state of said busy bit field;

(c) accessing a first element of said plurality of elements only if the state of said busy bit field indicates a non busy condition;

(d) testing for an interrupt prior to accessing another of said elements, (e) accessing another element pointed to by the address in the address field of said first element if no interrupt is detected by said testing;

(f) repeating the testing for an interrupt after accessing another element;

(g) setting said busy bit field to indicate a busy condition if an interrupt is detected by said testing;

(h) storing the contents of said interrupt operation field and said interrupt address field;

(i) handling the interrupt;

(j) checking the descriptor of any active task under which a list processing operation is being performed after the handling of the interrupt to determine if the active task is the same as the task under which a list processing operation was being performed prior to handling the interrupt;

(k) restarting the list processing operation if the active task after the handling of the interrupt is the same as the task under which a list processing operation was being performed prior to handling the interrupt; and (l) signaling a busy exception if the active task is not the same as the task under which a list processing operation was being performed prior to handling the interrupt.

3. The process according to claim 2 where restarting of said list processing operation includes the steps of:

(i) resetting said busy bit field to indicate a non busy condition; and (ii) retrieving the contents of said interrupt address field.

4. The process according to claim 3 in which the descriptor is an address of the task under which the list-processing operation is being performed.

5. A list processing apparatus comprising:

(a) addressable read/write digital storage means for storing:

(a.1) elements of a chained list, the chained list being defined by a header element and a plurality of chained elements;

(a.1.1) the header element comprising at least a busy bit field, an interrupted operation field, an interrupted address field and a first-chain-element address field; and (a.1.2) each chain element comprising at least a key field and an address field where the key field identifies the chain element and the address field encodes an address of a next chain element or an identifier for a last chain element in the chained list; and (a.2) a number of task objects where each can contain list-processing instructions, each task object being identified by a digital descriptor where only one task is active at any one time; and (b) digital processor means connected to the addressable storage for processing chained lists in response to a list-processing instruction issued by the active task, the list-processing instruction specifying a list-processing opration and a chained list on which the list-processing operation is to operate, the list-processing operation sequentially accessing the chain elements of the chained list in an order determined by the address encoded in the address field of the chain elements, the digital processor comprising:

(b.1) list-processing means including:

(b.1.1) a descriptor register and means for loading the descriptor register with a descriptor of the active task object issuing a list-processing instruction;

(b.1.2) a chained-list address register and means for loading digital information into the chained-list address register which encodes an address of the header element of the chained list specified by the list-processing instruction;

(b.1.3) means for:

(i) starting the list-processing operation at the chain element whose address is encoded in the first-chain-element address field of the header element if the busy bit field indicates that there is no list-processing operation on the chained list being held in abeyance;

(ii) checking for an interrupt prior to accessing a chain element;

(iii) setting the busy bit in the busy bit field if an interrupt exists;

(iiii) saving the descriptor of the task active at the time of the interrupt and the address in the address field of the last chained element accessed prior to the interrupt;

(iiiii) restarting the list-processing operation at a last-accessed chain element specified by a last-element-accessed address contained in the interrupted address field if the descriptor of the task active after the interrupt has been handled compares with the contents of the descriptor register; and (iiiiii) inhibiting the starting of the list-processing operation if the contents of the interrupt-status field signify that there is a list-processing operation on the chained list being held in abeyance and an interrupted-operation descriptor encoded in the interrupt-status field does not compare with the contents of the descriptor register.

6. A method for enabling interruption and restart of a list processing instruction executing in a multitasking computer system having an interrupt mechanism and where the list being processed is unbounded and can be accessed by more than one task, the improvement comprising:

sensing for the existence of an interrupt at a predetermined time during the execution of a list processing instruction, saving the status of the execution of the list processing instruction and the identification of task owning the executing list processing instruction when the existence of an interrupt is sensed, locking the list from access by any task other than the task owning said executing list processing instruction, checking the identification of the task having a list processing instruction attempting to access said list after said interrupt has been handled, unlocking said list if the checked task identification is the same as said saved task identification, and restoring the saved status of the list processing instruction executing prior to the interrupt being handled if said list is unlocked to enable continuation of execution of the list processing instruction from the point of interruption.

7. The method of claim 6 further comprising:
signaling a busy exception if the identification of the task having a list processing instruction for accessing said list is different from said saved identification.

8. Apparatus for enabling interruption and restart of a list processing instruction executing in a multitasking computer system having an interrupt mechanism and where the list being processed is unbounded and can be accessed by more than one task, the improvement comprising:

means for sensing for the existence of an interrupt at a predetermined time during the execution of a list processing instruction, means for saving the status of the execution of the list processing instruction and the identification of task owning the executing list processing instruction when the existence of an interrupt is sensed, means for locking the list from access by any task other than the task owning said executing list processing instruction, means for checking the identification of the task having a list processing instruction attempting to access said list after said interrupt has been handled, means for unlocking said list if the checked task identification is the same as said saved task identification, and means for restoring the saved status of the list processing instruction executing prior to the interrupt being handled if said list is unlocked to enable continuation of execution of the list processing instruction from the point of interruption.

9. The apparatus of claim 8 further comprising:
means for signaling a busy exception if the identification of the task having a list processing instruction for accessing said list is different from said saved identification.

* * * * *

UNITED STATES PATENT AND TRADEMARK OFFICE
CERTIFICATE OF CORRECTION

PATENT NO. : 4,429,360

DATED : Jan. 31, 1984

INVENTOR(S) : Roy L. Hoffman, William G. Kempke, John W. McCullough, Frank G. Soltis, Richard T. Turner It is certified that error appears in the above-identified patent and that said Letters Patent are hereby corrected as shown below:

Column 2, line 59, change "including" to -- includes --

Column 3, line 14, after "time" insert -- the --

Column 3, line 32, change "firt" to -- first --

Signed and Sealed this

Twenty-fourth Day of July 1984

[SEAL]

Attest:

GERALD J. MOSSINGHOFF

Attesting Officer  Commissioner of Patents and Trademarks